Sept. 1, 1970   F. A. E. PORSCHE ET AL   3,526,428
VENTILATION FOR A VEHICLE WITH A ROLL FRAME
Filed March 29, 1968   2 Sheets-Sheet 1

Inventor:
FERDINAND ANTON ERNST PORSCHE
WOLFGANG EYB
BY Craig & Antonelli
ATTORNEYS Sept. 1, 1970  F. A. E. PORSCHE ET AL  3,526,428
VENTILATION FOR A VEHICLE WITH A ROLL FRAME
Filed March 29, 1968  2 Sheets-Sheet 2

Inventor:
FERDINAND ANTON ERNST PORSCHE
WOLFGANG EYB

BY Craig & Antonelli
ATTORNEYS

United States Patent Office 3,526,428
Patented Sept. 1, 1970

3,526,428
VENTILATION FOR A VEHICLE WITH A ROLL FRAME
Ferdinand Anton Ernst Porsche, Stuttgart-Nord, and Wolfgang Eyb, Leonberg, Wurttemberg, Germany, assignors to Firma Dr. Ing. h.c.F. Porsche KG, Stuttgart-Zuffenhausen, Germany
Filed Mar. 29, 1968, Ser. No. 717,170
Claims priority, application Germany, Apr. 22, 1967, 1,630,923
Int. Cl. B62d 27/04; B60j 1/18
U.S. Cl. 296—146         7 Claims

ABSTRACT OF THE DISCLOSURE

A motor vehicle with a roof rigidly secured to the windshield and resiliently secured to a roll yoke with ventilation spaces therebetween, and a generally vertically extending rear window slideably received within a downwardly opening window guide channel secured to the inside of the roll yoke and an upwardly opening window guide channel pivotally mounted about a transverse axis to the lower vehicle body. A manual lever is provided for raising the rear window to cover openings in the downwardly opening channel, to lower the rear window to provide communication between the openings for ventilation of the vehicle, and to further lower the rear window until it is withdrawn from the downwardly opening channel so that it may be pivoted downwardly and rearwardly to an angular position where it is held by an indexing lock.

BACKGROUND OF THE INVENTION

Vehicles have been provided with self-supporting rigid roll yokes spanning the passenger compartment and attached on opposite sides to the vehicle body. Additional components, particularly the roof, have been attached to the roll yoke for covering the passenger compartment. In such a construction, it has been extremely difficult to provide a draft-free ventilation of the passenger compartment.

SUMMARY OF THE INVENTION

It is an object of the present invention to provide draft-free ventilation for a vehicle of the above-mentioned type, particularly with permanent ventilation and/or an adjustable ventilation that is distinguished by simple and inexpensive construction, which is safe in its operation.

According to the present invention, ventilation apertures or slots for ventilating the passenger compartment of a motor vehicle are provided in the immediate vicinity of the roll yoke and the passenger compartment covering.

The ventilation apertures are not provided in the roll yoke per se, which would have a disadvantageous effect upon the strength of the roll yoke. Rather, the ventilation apertures are provided between solid structural components of the car body, including the lower car body and roll yoke, and parts of the passenger compartment covering. Although in both of the above-mentioned constructions the expenditure for tools and the working time required would be small, only the construction according to the present invention will not result in a considerable reduction in the strength of the body components without additional expensive special measures being taken. Particularly in the aforementioned type of vehicle having a roll yoke, the roll yoke is the only component of the passenger compartment top enclosure that exhibits a rigidity sufficient for the safety of the passengers, which rigidity is preserved by the present ventilation construction.

Advantageously, the formation of the ventilation apertures may be simultaneous with the attachment of the passenger compartment covering to the roll yoke or lower car body. Also, it is contemplated that with this structure the through flow cross section of the ventilating apertures may be varied by simple means used for the connection, which eliminates additional complicated components solely for this purpose.

Additional advantages are gained by providing the roof portion of the passenger compartment covering with a rigid attachment to the windshield frame and a resilient attachment to the roll yoke so that it overlaps and is vertically spaced from the roll yoke to form the above-mentioned ventilating apertures. The overlapping may be partial or complete. Thus, a permanent ventilation of the passenger compartment is attained.

With such a resilient mounting of the roof on the roll yoke, a single ventilation construction is attained and at the same time the roof is relieved from stresses occurring during twisting of the vehicle body. Baffles or air deflection elements may be provided in the space of the ventilation apertures for preventing the entrance of water into the passenger compartment through the ventilating apertures or slots.

Additionally, or in the alternative, the passenger compartment may be ventilated by a rear portion or rear windowpane supported within the roll yoke and displaceable in the plane of its extent. The displaceable windowpane, preferably, is mounted within guide channels, at least one of which has ventilation openings that may be blocked or opened by displacement of the windowpane within the guide channels. One of the channels may be pivotally mounted to the vehicle so that the window may be withdrawn from the other channel and pivoted downwardly to a position where it may be held by an indexing clamp.

BRIEF DESCRIPTION OF THE DRAWING

Further objects, features and advantages of the present invention will become more clear from the following detailed description of the drawing, wherein.

DETAILED DESCRIPTION OF THE DRAWING

Figure 1:
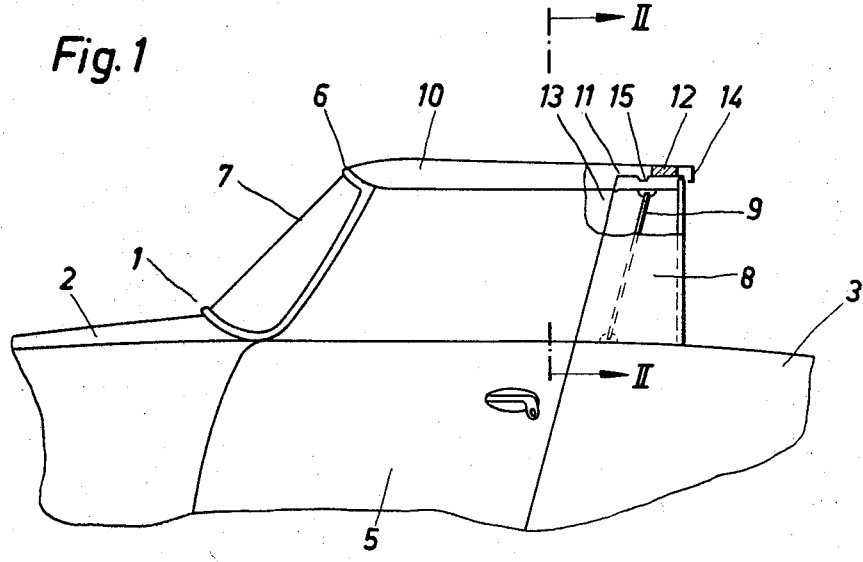
FIG. 1 is a partial side view, partly in cross section, of a passenger motor vehicle employing a covering and ventilation system according to the present invention.
Figure 2:
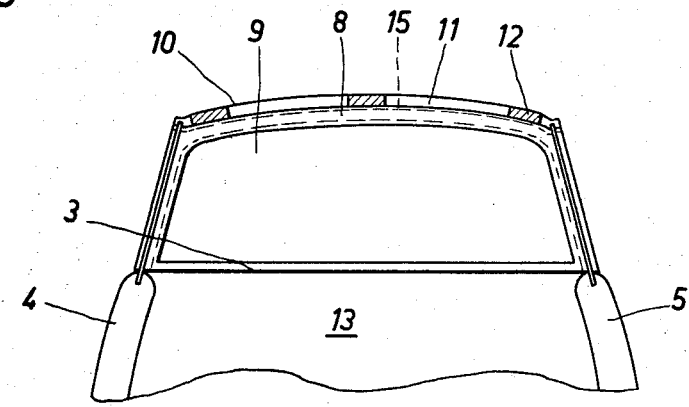
FIG. 2 is a partial cross-sectional view taken along line II—II of FIG. 1.

As shown in FIGS. 1 and 2, the motor vehicle 1 has a lower vehicle body comprising a front end structure 2, a rear end structure 3, and doors 4 and 5, which partially form a passenger compartment. The covering that encloses the top portion of the passenger compartment includes a windshield frame 6 having mounted therein a windshield 7, a rigid roll yoke 8 having mounted therein a rear windowpane 9, and a roof 10. The roof 10 is detachably and rigidly mounted at the windshield frame 6 and detachably and resiliently mounted at the roll frame; the resiliency at the roll frame 8 is mainly in the transverse direction.

Preferably, the roof 10 is constructed entirely or partially of a synthetic material and horizontally overlaps the roll yoke 8 with a vertical spacing therebetween. Within this slot 11 formed by the vertical spacing, there are a plurality of elastic spacer members 12 that are preferably secured to the roof 10 and engage the roll yoke 8 for supporting the roof 10 thereon. The roof 10 is held in its illustrated position by means of locks, latches or the like, which have not been shown because they may be conventional.

The free cross sectional areas of the slot 11 remaining between the elastic support members 12, as shown in FIG. 2, serve for the permanent ventilation of the passenger compartment space 13. The rear free edge 14 of the roof 10 is bent downwardly and inwardly to prevent water from entering the passenger compartment space 13. To further prevent the entrance of water, a transversely extending water collecting trough 15 is provided on the top surface of the roll yoke 8 immediately below the overlapping portion of the roof 10. Additional water penetration preventing baffles may be provided within the slot 11.

Figure 3:
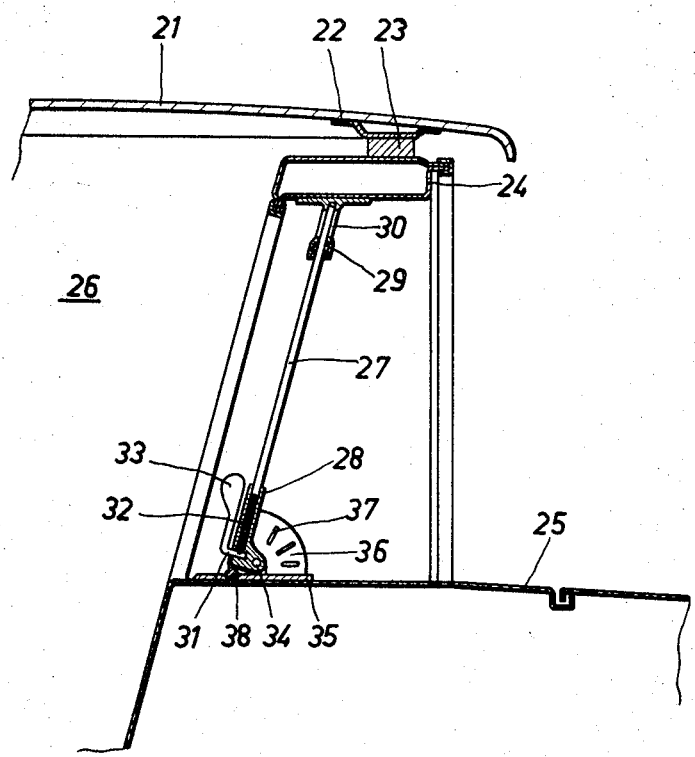
FIG. 3 is a partial cross-sectional view, on an enlarged scale, taken longitudinally through another embodiment, similar to FIG. 1.

Instead of or in addition to the ventilation spaces provided in the slot of the embodiment according to FIGS. 1 and 2, ventilation is provided within the roll yoke by the embodiment of FIG. 3.

In accordance with the embodiment of FIG. 3, the roof 21, which is secured to the windshield frame as described with respect to FIG. 1, is provided with a reinforcing channel member 22 having secured to its lower surface an elastic sealing strip 23 extending across the entire width of the roof 21, with its elasticity mainly in the transverse direction; also, 23 may represent a plurality of elastic support spacer bodies identical to the bodies 12 shown in FIG. 1 to provide a plurality of ventilating apertures between the roof 21 and the roll yoke 24. The roof 21 is preferably made of synthetic material with the reinforcing member 22 and secured to the roll yoke 24 by means of locks or the like, not shown. The roll yoke 24 is rigidly secured to the rear end structure of the vehicle in a conventional manner.

Within the roll yoke 24, there is provided a rear windowpane 27 received within an upwardly opening channel guide member 28 mounted to the rear end structure 25 of the vehicle. The top portion of the rear windowpane 27 is received within a downwardly opening guide channel member 29 that is secured to the lower inside of the roll yoke 24. The guide channel 29 is provided with a plurality of apertures 30 in its parallel leg portions to provide ventilating communication between the passenger compartment 26 and the outside atmosphere when the rear windowpane 27 is spaced therefrom. The apertures or openings 30 may be closed by upward movement of the windowpane 27 into an interposed blocking position. For this purpose, the guide channels 28, 29 have a spacing between their web portions that is substantially larger than the corresponding dimension of the windowpane 27 so that the windowpane 27 is displaceable in its plane to a limited degree. For moving the windowpane 27 between its various positions, the guide channel member 28 is provided with an adjusting or actuating shaft 31 passing through the inner leg of the guide channel 28 and having a lever 32 rigidly connected thereto for upward and downward movement within the guide channel member 28 to engage the lower edge of the windowpane 27. A manual operating lever or handle 33 is mounted on the other end of the shaft 31 so that rotation of the manual lever 33 will cause upward and downward movement of the rear windowpane 27.

In the position illustrated in FIG. 3, the rear windowpane 27 is in its upwardmost position where it is interposed between and blocks the apertures or openings 30 in the guide channel member 29. From this position, the manual lever 33 may be operated to lower the rear windowpane 27 to move the rear windowpane 27 downwardly to a position spaced from the openings 30 so that the passenger compartment 26 may be ventilated. Further lowering of the windowpane 27 will allow it to slide completely out of the guide channel member 29 so that the guide channel member 28 may be pivoted about transverse axis or shaft 34 for movement of the rear windowpane 27 downwardly and to the rear to a position supported on the rear end structure 25. The bracket 35 is mounted on the rear end structure 25 and supports the pivoting shaft 34 and thus the guide channel member 28.

Also, an indexing plate 36 may be provided with a plurality of recesses or cutouts 37 to cooperate with a corresponding detent member on the guide channel 28 for indexing or holding the rear windowpane 27 in various angular positions between its illustrated position and its position resting on the rear end structure 25. Also, means may be provided to lock the windowpane 27 in any position between its two extremes. Furthermore, it is contemplated that openings for ventilation may be provided additionally or solely in the guide channel member 28 to be controlled by movement of the windowpane 27. Additional means, not shown, may be provided to prevent the windowpane 27 from sliding out of the guide channel member 28 when the windowpane 27 is disposed on the rear end structure 25.

A permanent or continuous ventilation of the passenger compartment 26 may be provided by omitting, completely or partially, the sealing strip 38 that seals the gap between the bracket 35 and the guide channel member 28.

Although specific preferred embodiments have been shown and illustrated in detail for purposes of illustration, further variations, embodiments and modifications are contemplated within the spirit and scope of the present invention.

What is claimed is:

1. An automotive vehicle, comprising: a lower vehicle body partially forming a passenger compartment; a rigid roll yoke self-supportingly attached on opposite sides of said lower vehicle body and spanning said passenger compartment; a covering, together with said roll yoke and said lower vehicle body, enclosing said passenger compartment, said covering being detachably secured to said roll yoke and said lower vehicle body; and means ventilating said passenger compartment, including a plurality of apertures in the immediate vicinity of at least one of the connections of said coverings with said lower vehicle body and said roll yoke, wherein said covering includes a windshield frame secured to said lower vehicle body and a roof over said passenger compartment rigidly secured to said windshield frame and resiliently secured to said roll yoke; the rear portion of said roof horizontally overlapping and being vertically spaced with respect to said roll yoke to form therebetween said apertures to provide for continuous ventilation of said passenger compartment.

2. The vehicle according to claim 1, wherein said roll yoke has a transversely extending water collecting trough opening upwardly into said apertures, and wherein said roof has a rear free transverse edge downwardly extending below said roll yoke and to the rear thereof for preventing rain from entering through said apertures.

3. The vehicle according to claim 2, said covering including a rear windowpane; a downwardly opening windowpane, transversely extending guide channel member mounted on the lower inside surface of said roll yoke receiving therein said rear windowpane, and having opposed leg portions and a web portion; an upwardly opening transversely extending windowpane guide channel member having opposed leg portions and a web portion on said lower vehicle body and receiving therein said rear windowpane; said apertures including aligned openings in the leg portions of said downwardly opening guide channel member; the web portions of said channel members being spaced from each other by a distance substantially larger than the corresponding dimension of said rear windowpane; means for moving said windowpane between a first position within said downwardly opening guide channel member between and blocking said openings, a second position within said downwardly opening guide channel member spaced from said openings, and a third position completely out of said downwardly opening guide channel member; said upwardly opening guide channel member being mounted for pivotal movement of said rear windowpane, when in its third position, rearwardly and downwardly to a substantially horizontal position resting on said lower vehicle body; and further including indexing means for holding said rear windowpane in angular positions between said horizontal position and said third position.

4. An automotive vehicle, comprising: a lower vehicle body partially forming a passenger compartment; a rigid roll yoke self-supportingly attached on opposite sides of said lower vehicle body and spanning said passenger compartment; a covering, together with said roll yoke and said lower vehicle body, enclosing said passenger compartment, said covering being detachably secured to said roll yoke and said lower vehicle body; and means ventilating said passenger compartment, including a plurality of apertures in the immediate vicinity of at least one of the connections of said coverings with said lower vehicle body and said roll yoke, said covering including a portion adjacent said apertures, movably mounted with respect to said roll yoke and said lower vehicle body for varying the effective cross-sectional through-flow area of said apertures, said portion of said covering being provided in the rear of the vehicle, being generally vertically-extending, and being displaceably mounted along its vertical extent, wherein said rear covering portion is a rear windowpane; said covering including at least one channel member having openings therein constituting said apertures and receiving therein said windowpane for displacement between a position spaced from said openings and a position aligned with and blocking said openings.

5. The vehicle according to claim 4, including means for mounting said rear windowpane on at least one of said roll yoke and said lower vehicle body for pivoting movement about a transverse axis.

6. A vehicle, comprising: a rigid frame forming a window opening; a downwardly opening window guide channel member having spaced parallel leg portions and a web portion; an upwardly opening window guide channel member opposed with respect to said downwardly opening window guide channel and having spaced parallel leg portions and a web portion; a generally vertically extending windowpane slidably received within said channels and being of a generally vertical dimension substantially less than the corresponding distance between said web portion; the leg portions of at least one of said channels having openings providing ventilation passages in the absence of said windowpane; means for moving said windowpane between a first position within said downwardly opening guide channel member between and blocking said openings, and a second position within said downwardly opening guide channel member spaced from said openings, wherein said means for moving moves said windowpane to a third position completely out of said downwardly opening guide channel member; said upwardly opening guide channel member being mounted for pivotal movement of said rear windowpane, when in its third position, rearwardly and downwardly to a substantially horizontal position; and including indexing means for holding said rear windowpane in angular positions between said horizontal position and said third position.

7. An automotive vehicle comprising: a lower vehicle body partially forming a passenger compartment; a rigid roll yoke self-supportingly attached on opposite sides of said lower vehicle body and spanning said passenger compartment; a covering, together with said roll yoke and said lower vehicle body, enclosing said passenger compartment, said covering being detachably secured to said roll yoke and said lower vehicle body; first means ventilating said passenger compartment, including a plurality of apertures in the immediate vicinity of at least one of the connections of said covering with said lower vehicle body and said roll yoke, said apertures being provided directly between said covering and one of said parts consisting of said roll yoke and said lower vehicle body, to form said apertures simultaneously with the formation of the connection therebetween; and second, selectively-adjustable means provided within the space defined by said roll yoke for additionally ventilating said passenger compartment.

References Cited

UNITED STATES PATENTS

| | | | |
|---|---|---|---|
| 1,139,244 | 5/1915 | Warren | 49—258 |
| 1,588,654 | 6/1926 | Brownlee | 98—2 |
| 1,706,026 | 3/1929 | Goldsmith et al. | 98—2 |
| 1,804,264 | 5/1931 | McDevitt | 98—2 |
| 2,023,699 | 12/1935 | Robinson | 296—146 |
| 3,059,561 | 10/1962 | Wilfert | 98—2 |
| 3,136,239 | 6/1964 | Geiger | 98—2 |

LEO FRIAGLIA, Primary Examiner

M. L. SMITH, Assistant Examiner

U.S. Cl. X.R.

49—196, 259; 98—2; 280—150; 296—137